United States Patent [19]

Zumstein

[11] Patent Number: 5,185,510

[45] Date of Patent: Feb. 9, 1993

[54] INSTALLATION FOR CUTTING A WORKPIECE AND METHOD FOR THE CONTROL THEREOF

[75] Inventor: Ernst Zumstein, Burgdorf, Switzerland

[73] Assignee: Bystronic Laser AG, Switzerland

[21] Appl. No.: 715,394

[22] Filed: Jun. 14, 1991

[30] Foreign Application Priority Data

Jul. 4, 1990 [CH] Switzerland ............. 2226/90-0
Oct. 8, 1990 [EP] European Pat. Off. ...... 90810770.9

[51] Int. Cl.$^5$ ............................................. B23K 26/00
[52] U.S. Cl. ........................... 219/121.67; 219/121.82
[58] Field of Search ................ 219/121.67, 121.72, 219/121.82, 121.18, 121.39

[56] References Cited

U.S. PATENT DOCUMENTS 4,760,237  7/1988  Mizukado et al. .......... 219/121.82
5,049,723  9/1991  Macdonald ................. 219/121.83

FOREIGN PATENT DOCUMENTS 0327895  1/1989  European Pat. Off. .

OTHER PUBLICATIONS

Patent Abstracts of Japan; vol. 13, No. 77 (M-801)(3425) Feb. 22, 1989 & JP-A-63 278 694 (Fujitsu Ltd) Nov. 16, 1988.
Patent Abstracts of Japan; vol. 12, No. 182 (M-702)(3029) May 27, 1988 & JP-A-63 292 293 (Mitsubishi Electric Corp.) Dec. 18, 1987.
Patent Abstracts of Japan; vol. 13, No. 67 (M=798)(3415) Feb. 15, 1989 & JP-A-63 268 591 (Amada Co., Ltd.).

*Primary Examiner*—C. L. Albritton
*Attorney, Agent, or Firm*—Ostrolenk, Faber, Gerb & Soffen

[57] ABSTRACT

The supporting grate of a laser cutting machine is formed of swinging supporting arms which are swung from a horizontal supporting position to a lowered intermediate position or to a completely lowered, approximately vertical position. When the laser beam is travelling through their area, individual supporting arms are lowered to the intermediate position so as not to disturb the cutting operation, to avoid damages of the supporting arm and to prevent damages of the underside of the workpieces by reflections of the beam. Cutout pieces are continually removed by lowering the supporting arms under said pieces so that said pieces are dropped onto a conveyor belt and carried off. As soon as all pieces are cut out, all supporting arms are lowered, whereby the remaining grid is dropped onto the conveyor belt and can be carried off. A coordinated program control for the displacement of the cutting head and the movement of the supporting arms is provided.

13 Claims, 4 Drawing Sheets

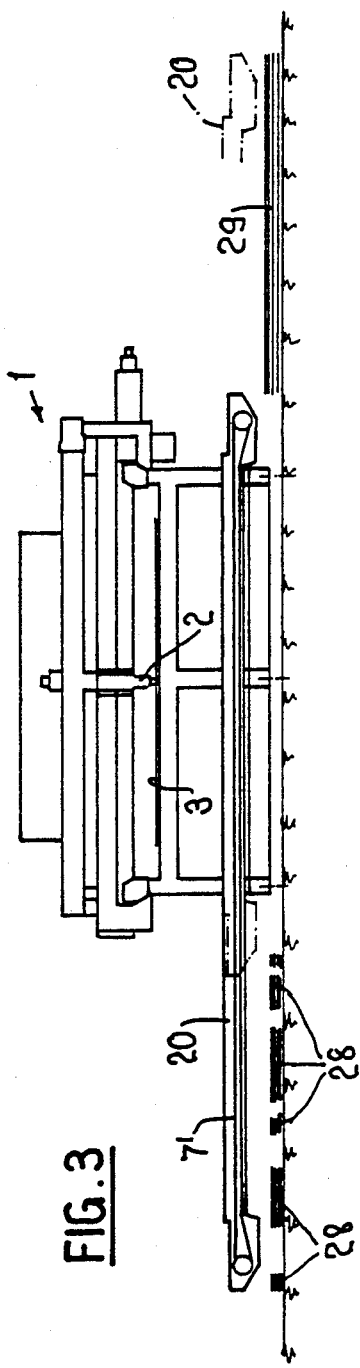
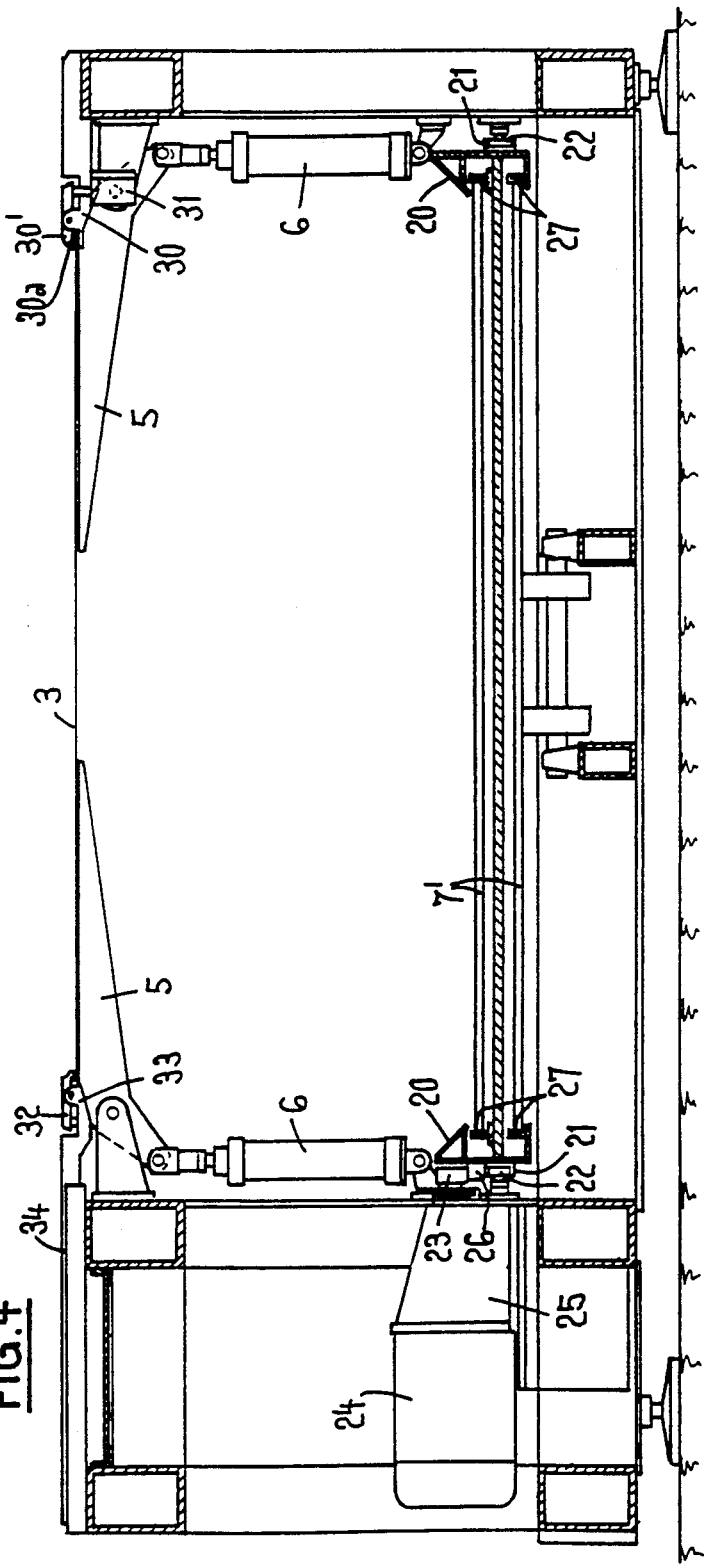
FIG.3
FIG.4

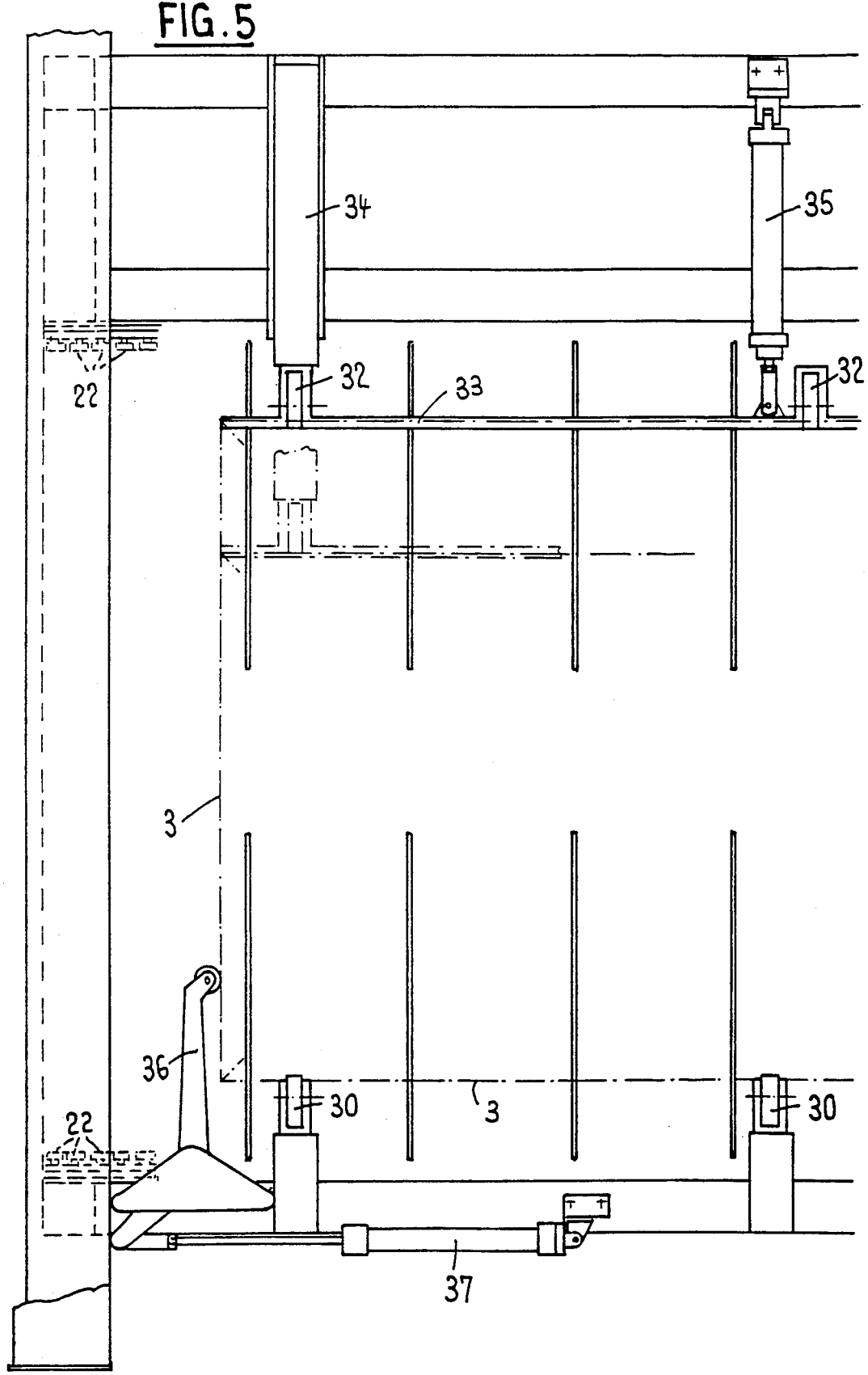

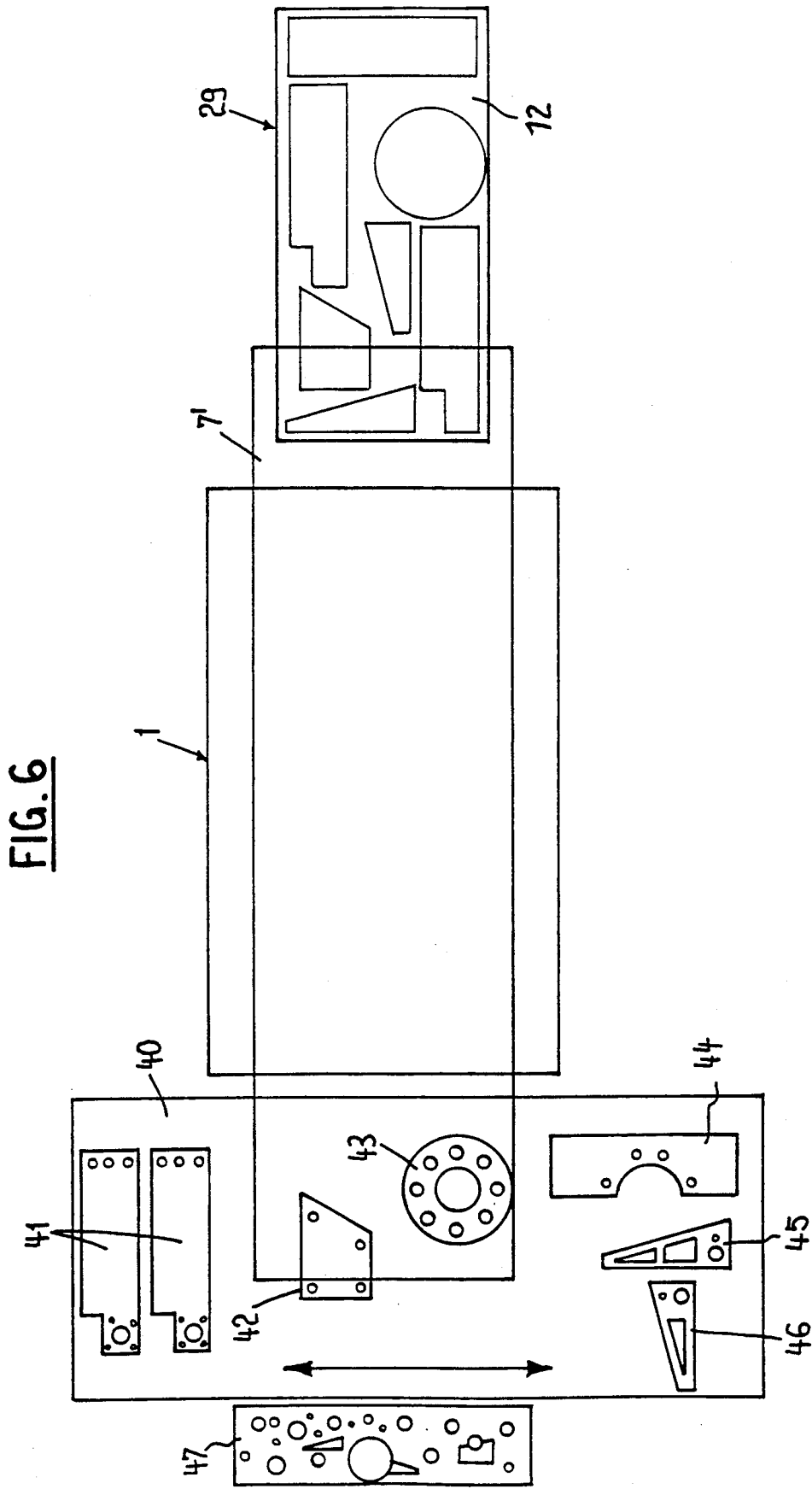

INSTALLATION FOR CUTTING A WORKPIECE AND METHOD FOR THE CONTROL THEREOF

The present invention refers to an installation for cutting a workpiece, in particular a flat workpiece, by means of a beam, in particular a laser beam, comprising a grate of supporting elements for said workpiece, said elements being movable from a supporting position to an ineffective position away from said workpiece, and to a method for the control of such an installation. Such an installation is known from European Patent Application No. EP-A-0 327 895, wherein supporting fins are individually lowered by mechanical means under control of the cutting head. This installation is advantageous in that said supporting fins may be removed from the workpiece in the range of the laser beam to such an extent that they do not disturb the cutting operation nor are damaged by the laser beam, and that they do not cause any reflections which might damage the underside of the workpiece. However, this known, purely mechanically operated installation is not capable of performing further functions.

The present invention is based upon the task of arranging and controlling the movable supporting elements in such a manner that they can perform other functions in addition to those mentioned above. This object is attained by means of an installation for cutting a workpiece wherein a common program control is provided for the displacement of said beam along a cutting line and for the displacement of said supporting elements, and by a method for the control of such an installation wherein individual supporting elements are moved out of the range of said beam, groups of supporting elements are displaced, preferably swung down, in order to remove cutout pieces, and all or most of said supporting elements are displaced, preferably swung down, in order to remove the remaining grid of said flat material. Thus, not only the uncomfortable and unreliable mechanical actuation of the supporting elements is eliminated, but it is possible to design the program in such a manner that the supporting elements may be displaced individually, in groups or in common. Said supporting elements are preferably designed such as to be swinging. It is thus possible by swinging down individual groups of supporting elements to drop and remove cutout pieces or to drop and remove the remaining grids where all parts have been cut out, by swinging down all supporting elements, i.e. the entire grate.

The invention is explained in more detail hereinafter with reference to examples of embodiments which are illustrated in the drawing.

FIG. 3 shows, a side elevation of the second installation;

FIG. 4 shows a partial section of the second installation;

FIG. 5 shows a partial plan view of the second installation; and

FIG. 6 shows an alternative embodiment.

Figure 1:
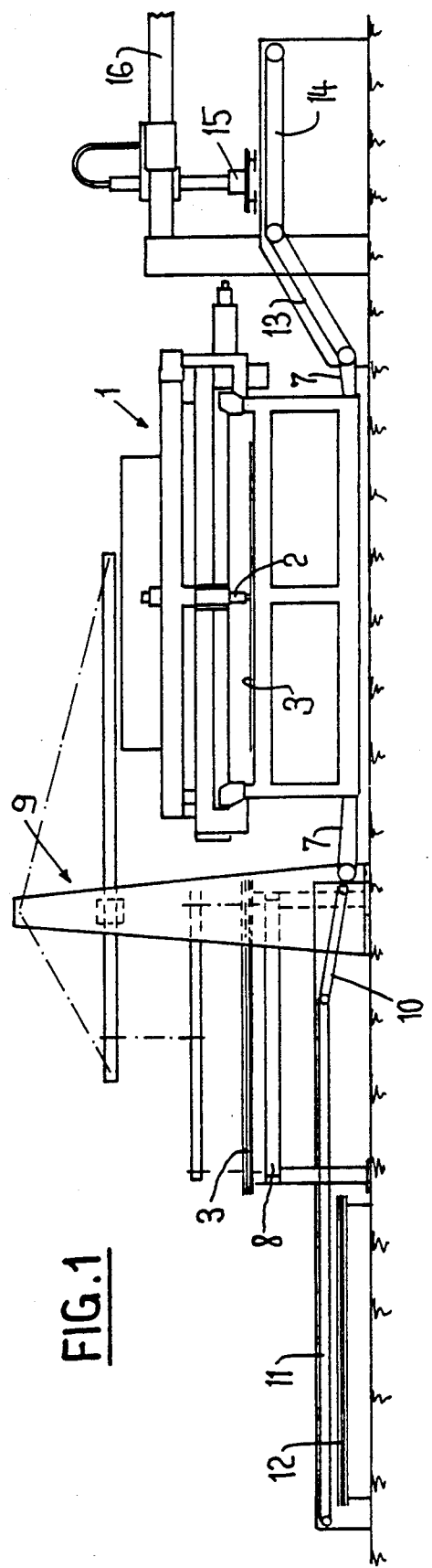
FIG. 1 shows a side elevation of the first installation.
Figure 2:
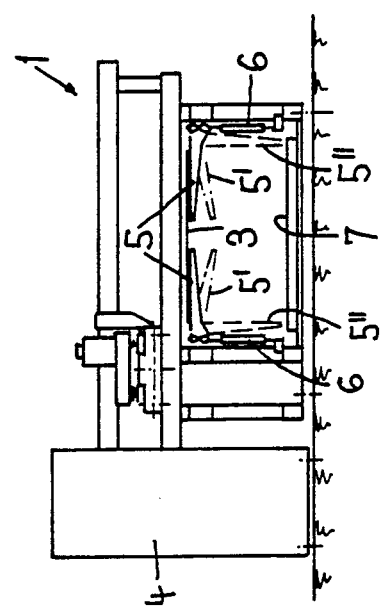
FIG. 2 shows a front view thereof.

The installation illustrated in FIGS. 1 and 2 comprises a laser cutting machine 1 with a cutting head 2 which serves to cut out pieces from a plate 3, e.g. a steel plate. Said cutting head 2 is capable of being displaced longitudinally and transversally above workpiece 3 in a known manner. The CNC control of the displacement of cutting head 2 is effected by means of a program control which is accommodated in a cabinet (not shown). The laser beam is conducted from laser resonator 4 to cutting head 2 by means of movable mirrors. As shown in FIG. 2, plate 3 is supported on a grate which is formed of swinging arms or fins 5. The length of each of said supporting arms 5 corresponds to about half the width of the working surface, respectively the supporting grate, and each of said arms is pivotably mounted at its outer end. By means of hydraulic or pneumatic cylinders 6, the supporting arms are either held in abutment against a stop in their horizontal supporting position, which is shown by solid lines and in which they support plate 3, or they are swung to a partly lowered position 5' or to a completely lowered position 5''. Said positions, respectively movements of each individual supporting arm are controlled by a common program control for cutting head 2 and supporting arms 5.

Underneath supporting arms 5, a conveyor belt 7 is provided which may be driven resp. displaced in both directions.

In front of laser cutting machine 1, a table 8 is disposed to which unworked plates are delivered. By means of a transport system 9, individual plates 3 are brought from table 8 to the working position in cutting machine 1. Under table 8, conveyor belts 10 and 11 are disposed which serve for the transport of remaining grids to a stack 12. Further conveyor belts 13 and 14 at the back of cutting machine 1 serve for the disposal of cutout pieces which are taken over from conveyor belt 14 by a gripper 15 and carried on along a guide rail 16.

In order to cut out pieces from a plate 3, cutting head 2 is controlled in a known manner according to a determined program. The same program provides data for the control of supporting arms 5 in such a manner that the respective supporting arm is swung down to position 5' when the laser beam is in the area of said supporting arm. As mentioned, this prevents that the cutting operation is disturbed by the supporting arm, that the supporting arm is damaged, or that the underside of the plate is damaged by reflection of the laser beam. As soon as a given piece is completely cut out, one supporting arm or an entire group of supporting arms, according to the size of said piece, are lowered to position 5'', so that said piece is dropped onto conveyor belt 7, the supporting arms being lowered on both sides or on one side only. Said pieces are then continually removed by means of conveyor belt 7 and conveyor belts 13 and 14 as well as gripper 15. As all pieces are removed from the supporting grate immediately after the cutting operation, there is no risk that detached pieces are dislocated and hinder further cutting operations or are damaged by the laser beam. As soon as all pieces are cut out and removed, all supporting arms 5 or at least as many supporting arms as required are swung down to position 5'', whereby the remaining grid of plate 3 is dropped onto conveyor belt 7. Conveyor belt 7 is now driven in the reverse direction, and the remaining grid is transported to stack 12 by conveyor belt 7 and by conveyor belts 10 and 11. Meanwhile, supporting arms 5 may be swung back in order to receive a new plate 3, and a new cutting operation is started substantially without any delay.

As mentioned, the control of supporting arms 5 is effected by the central program control via electric valves which are associated with cylinders 6, said control being coordinated with the control of cutting head 2. The horizontal supporting position of arms 5 as well as their entirely lowered position 5'' are determined by mechanical stops. The intermediate position 5', which need not be precisely determined, may be adjusted by a temporally measured supply of pressure medium to the respective cylinder(s). A different arrangement might be provided as well. For example, the arms might by actuated by electromechanical means. Instead of being swung down, the supporting arms might also be drawn out laterally. To dispose of pieces, individual supporting arms or groups thereof might be only partly lowered, too.

FIGS. 3 to 5 show a second embodiment wherein corresponding parts of the installation are referenced as in FIGS. 1 and 2. In FIG. 3, only the laser cutting machine 1 is represented. An essential difference with respect to the embodiment according to FIGS. 1 and 2 is that instead of conveyor belts 7, 10, 11, 13 and 14, a single conveyor belt 7' is provided which however is disposed in a longitudinally displaceable slide 20. Said slide 20 is shown in crosssection in FIG. 4. Its longitudinal profiles, referenced by the numeral 20, are guided by means of U-rails 21 and sets of rollers 22. A pinion 23, capable of being driven by a motor 24 via gear 25, is in engagement with a rack 26 of slide 20, whereby said slide is displaceable in the longitudinal direction. Both sides of conveyor belt 7' are supported in the longitudinal profiles of the slide by means of rollers 27. FIG. 3 shows the usual operating position of slide 20 resp. conveyor belt 7', i.e. projecting to the left in order to depose cutout pieces on stack 28. The delivery of new, unworked plates may be effected as described with reference to FIGS. 1 and 2, or differently, e.g. transversally to the conveying direction of conveyor belt 7', if necessary.

In order to remove a remaining grid 12 which according to the peceding has arrived on the conveyor belt by lowering all the supporting arms 5, slide 20 is moved to the end position indicated by dotted lines in FIG. 3 while conveyor belt 7' is at standstill. Then, conveyor belt 7' is driven in order to convey the remaining grid 12 over the right end of slide 20, and slide 20 is retracted to the left at the same speed. The remaining grid is thereby deposited on a stack 29 without longitudinal displacement.

In the embodiment of FIGS. 3 to 5, special clamping or retaining chucks for the worked plate are provided. Corresponding chucks might be present in the embodiment of FIGS. 1 and 2 as well. Stationary retaining chucks 30 are arranged on one longitudinal side of the supporting grate, the upper clamping levers 30' of which are actuated by means of a pneumatic cylinder 31. On the opposite longitudinal side, similar but movable retaining chucks are provided, the clamping levers 32 of which are actuated by non-represented cylinders. Said movable retaining chucks are connected by an abutment rail 33 which is schematically illustrated in FIG. 5 and which is provided at both ends with guides 34, an actuating cylinder 35 acting upon its center. Further, FIG. 5 shows a positioning lever 36 which is actuated by cylinder 37 in order to position the supported plate in the longitudinal direction.

For the application of a new plate 3, said abutment rail 33 including chucks 32 as well as positioning lever 36 are retracted as far as to allow a free placement of the plate. Lever 36 and abutment 33 are then advanced towards the adjoining edges of the plate and said plate is pushed towards the opposite abutments and is thus positioned.

In the transversal direction, said abutments are formed by shoulders 30a of chucks 30. The retaining chucks 30 and 32 are then closed in order to hold plate 3. This is particularly important since the supporting grate is not stable during processing. After processing, the retaining chucks 30 and 32 can remain closed until supporting arms 5 are entirely lowered, whereupon the retaining chucks are released and the remaining grid is dropped onto the conveyor belt. It is thus avoided that the remaining grid slides over the lowering supporting arms and damages their supporting surfaces.

An alternative embodiment of the installation is schematically represented in FIG. 6. Cutting macnine 1 and conveyor belt 7' correspond to the above-described components of the installation. Likewise, conveyor belt 7' serves for the removal and the deposition of remaining grids 12 on stack 29 as well as of cutout pieces 41 to 46 and scraps. Said pieces are deposited on a table 40 which is transversally displaceable with respect to the travelling direction of conveyor belt 7'. Residues, i.e. pieces which have been cut out of pieces 40 to 46, are conveyed to a scrap container 47. For the deposition of pieces 41 to 46 on table 40, said table is brought to the respective corresponding position, and slide 20 including conveyor belt 7' is extended as far as to deposit the respective piece on the correct stack of pieces by simultaneous driving of the conveyor belt to the left and retraction of slide 20 at the same speed to the right. In this case, a gripper or similar auxiliary devices for sorting the pieces may be omitted.

The embodiments described above refer to laser cutting installations. However, the arrangement of the invention can be advantageously applied to other cutting processes, e.g. water torching, particle beam or cutting flame processing.

What I claim is:

1. An installation for cutting a workpiece, in particular a flat workpiece, by means of a beam, in particular a laser beam, comprising a grate of supporting elements for said workpiece, said elements being movable from a supporting position to an ineffective position away from said workpiece, wherein a common program control is provided for the displacement of said beam along a cutting line and for the displacement of said supporting elements.

2. An installation according to claim 1, wherein said supporting elements are adapted to be swung down or to be moved out laterally.

3. The installation of claim 2, wherein a conveying device is provided underneath said grate.

4. The installation of claim 2, wherein said supporting elements are capable of being swung down in groups in order to drop cutout pieces.

5. The installation of claim 3, wherein said conveying device is reversible in order to transport pieces to one side and remaining grids to the other side.

6. The installation of claim 5, wherein all of said supporting elements are capable of being swung down in common.

7. The installation of claim 1, wherein supporting arms are provided whose respective length approximately corresponds to half the width of said supporting grate, and wherein the opposite sides of said supporting grate are journalled in such a manner as to swing downwards.

8. The installation of claim 3, wherein said conveying device comprises a belt disposed on a slide which is movable in the travelling direction of said conveyor belt, the travelling direction of both the conveyor belt and the slide being reversible.

9. The installation of claim 1, wherein retaining chucks are provided for holding said workpiece.

10. The installation of claim 9, wherein said retaining chucks are provided with abutment surfaces for said workpiece.

11. The installation of claim 8, comprising a stacking table for cutout pieces which is displaceable transversely with respect to the travelling direction of said conveyor belt and over which one end of said conveyor belt can be positioned.

12. The installation of claim 1, wherein said program control is connected for moving individual said supporting elements out of the range of said beam, for displacing groups of said supporting elements in order to remove cutout pieces, and for displacing most of said supporting elements displaced in order to remove the remaining grid of said flat material.

13. The installation of claim 12, wherein retaining chucks are provided for holding said workpiece and said program control is connected for releasing said retaining chucks for said workpiece as soon as said supporting elements are completely displaced in order to remove the remaining grid.

* * * * *